UNITED STATES PATENT OFFICE.

JOHN CAWLEY, OF NEWARK, NEW JERSEY, ASSIGNOR TO HORE, BARNETT & CO., OF NEW YORK, N. Y.

ZINC PIGMENT AND PROCESS OF MAKING THE SAME.

SPECIFICATION forming part of Letters Patent No. 251,187, dated December 20, 1881.

Application filed April 12, 1881. (Specimens.)

*To all whom it may concern:*

Be it known that I, JOHN CAWLEY, of Newark, in the county of Essex and State of New Jersey, have invented a new and useful Improvement in Zinc Pigments and in Processes of Making the same, of which the following is a specification.

In the manufacture of sulphide-of-zinc pigments by processes heretofore published the precipitate resulting from the action of an alkaline or alkaline-earthy sulphide on a solution of zinc-salt, consisting either of hydrated sulphide of zinc alone or of that compound in combination with hydrated sulphates of barium or calcium, or both, is dried, ignited at a red heat in a muffle or other suitable furnace, levigated, redried, and ground, when it is ready for use as a pigment.

The object of the ignition, improperly called "calcination," is to dehydrate the sulphide of zinc and certain precipitated sulphates, if present, and give to the resulting pigment the requisite density, body, and whiteness. The product thus prepared, though possessing many of the essential qualities of a good white pigment, has nevertheless one serious defect—viz., an extreme sensitiveness to light, especially in certain conditions of the atmosphere. A few moments' exposure to sunlight causes the pigment to assume a dark lead color, and this discoloration on prolonged exposure becomes permanent.

The object of my invention is to produce a white pigment containing sulphide of zinc which will not discolor on exposure to light. I have discovered that by igniting, or "calcining," as it is sometimes called, hydrated sulphide of zinc and precipitated sulphate of barium with a proper proportion of intimately-mixed oxide of magnesium, the resulting product will be a white-zinc pigment which will possess far greater permanence of color when exposed to sunlight, and at the same time an equal or greater whiteness and covering power, than the sensitive pigment above mentioned.

The process which I prefer for making my pigment is as follows:

First. A solution of sulphate of zinc is placed in a vat or suitable vessel, and completely precipitated by means of a solution of sulphide of barium. The resulting precipitate will be a combination of sulphide of zinc and sulphate of barium.

Second. A solution of a salt of magnesia—as the chloride or sulphate—capable of yielding an amount of oxide of magnesium equal to about five per cent. of the weight of the pigment when finished. A proportion which I find to give the best results is added to the above precipitate when in a moist condition, and preferably in the same vessel or vat, and is completely precipitated by the proper amount of caustic alkali—as oxide of sodium or barium—added as soon after the introduction of the solution of magnesia as convenient.

Third. The resulting mass is then filtered, dried, and ignited at a red heat on the sole of a muffle or suitable furnace, and the resulting pigment ground in water, filtered, washed, dried, and ground to a fine powder, when it is ready for use either by mixing with oil for paint or for other purposes.

Instead of using sulphide of barium, as above indicated in the first step of the above-described process, sulphide of calcium or a mixture of sulphide of barium and sulphide of calcium may be employed with substantially the same results.

The important step in this process consists in the addition of magnesium as an oxide rather than as a carbonate or other salt to the precipitated sulphide of zinc and sulphate of barium before ignition, for the purpose of preventing the pigment from being sensitive to light, which would be the case were no oxide of magnesium present from the commencement of the operation of ignition.

When the pigment is made according to my method it will be non-sensitive—that is, it will not become readily discolored by exposure to light—and this result cannot be obtained by the use of the carbonate or any other salt of magnesium in place of the oxide during the operation of ignition, or by adding the oxide of magnesium after ignition.

Instead of using the precipitated oxide of magnesium in its wet state, it may be mixed with the precipitated sulphide of zinc and sulphate of barium in the condition of a dry powder in about the same proportions as above given. I however prefer to precipitate it as above described, as by so doing a more uniform and intimate combination or compound can be obtained.

When made by the above method the finished pigment will contain about thirty per cent. of sulphide of zinc, about sixty-five per cent. of sulphate of barium, and about five per cent. of oxide of magnesium. In case the sulphide of calcium is used in place of the sulphide of barium, the finished pigment will contain about forty per cent. of sulphide of zinc, about fifty-five per cent. of sulphate of calcium, and about five per cent. of oxide of magnesium.

The above are the proportions I prefer as giving the best results, though others may be used without departing from the principle of my invention. For instance, a larger quantity of oxide of magnesium could be used without material injury to the finished pigment, though the expense would be somewhat increased thereby, while a less quantity would undoubtedly give a proportionate benefit.

I am aware that Letters Patent No. 212,017, of February 4, 1879, and Reissue No. 9,481, of November 30, 1880, granted to Henry Knight, describe a composition of matter produced by mixing sulphide of zinc with native sulphate of baryta and with carbonate of magnesium, and then igniting or calcining the mass and reducing it to a powder for use as a pigment. It is to be observed that the pigment referred to in the said Knight patent differs in many important respects from that obtained by my process as above described. Some of the distinguishing characteristics of these two pigments are as follows: The Knight pigment is simply a mechanical mixture, the crystalline particles of the native sulphate of barium it contains being readily discernible by a magnifying-glass, and being also separable from the other constituents by mechanical means. The native sulphate acts merely as a diluent or adulterant, reducing the covering power of the zinc sulphide according to the quantity used. The pigment is also stony and hard in texture, quite yellowish in color, and of very inferior covering power. On the contrary, the pigment made according to my process is soft and fine in texture, very white in color, of homogeneous structure, and possesses superior body or covering power, and cannot be separated into its component parts by mechanical means. I also claim that when the sulphide of zinc and the sulphate of barium (or calcium, or both) are precipitated together a true chemical compound is formed belonging to the class known to chemists as "double salts." Even when my finished pigment contains two-thirds its weight of precipitated sulphate of barium, (or calcium, or both,) which sulphates by themselves are known to possess but feeble body as a paint, it will be found to possess a covering power almost equal to that of the pure sulphide-of-zinc pigment, showing that the properties of the precipitated sulphate of barium (or calcium, or both) have been modified by combination with the zinc-salt.

What I claim as new is—

1. The method of producing non-sensitive white pigments, consisting in intimately mixing precipitated sulphide of zinc and precipitated sulphate of barium, or its equivalent, with oxide of magnesium, igniting the mass at a red heat, and then reducing it to powder, substantially as described.

2. The improved pigment above described, composed of precipitated sulphide of zinc, precipitated sulphate of barium, or its equivalent, and oxide of magnesium, having the properties substantially above set forth.

JOHN CAWLEY.

Witnesses:
JAMES P. BARNETT,
BENJ. A. SMITH.